United States Patent [19]
Stark et al.

[11] Patent Number: 6,127,459
[45] Date of Patent: Oct. 3, 2000

[54] EPOXY RESIN CURING AGENT-REACTING ACID-TERMINATED POLYALKYLENE GLYCOL WITH EXCESS AMINE-TERMINATED POLYAMINE-EPOXY RESIN ADDUCT

[75] Inventors: Charles J. Stark, deceased, late of Houston, by Ann Elizabeth Stark, Administrator; Gayle Edward Back; Jimmy D. Elmore, both of Houston; Kalyan Ghosh, Richmond; Pen-Chung Wang; Kailash Dangayach, both of Houston, all of Tex.

[73] Assignee: Shell Oil Company, Houston, Tex.

[21] Appl. No.: 09/095,090

[22] Filed: Jun. 10, 1998

Related U.S. Application Data

[60] Provisional application No. 60/065,340, Nov. 13, 1997.

[51] Int. Cl.$^7$ .......................... C08G 59/14; C08G 59/44; C08G 59/50; C08K 3/20; C08L 63/02
[52] U.S. Cl. .......................... 523/414; 523/404; 523/417; 523/420; 525/504; 525/533; 525/423
[58] Field of Search ...................................... 525/407, 423, 525/504, 533; 523/404, 414, 426, 417, 420

[56] References Cited

U.S. PATENT DOCUMENTS

| | | | |
|---|---|---|---|
| 3,998,771 | 12/1976 | Feneis, Jr. et al. ................. | 260/18 PN |
| 4,352,898 | 10/1982 | Albers ...................................... | 523/414 |
| 5,017,675 | 5/1991 | Marten et al. ........................... | 528/111 |
| 5,032,629 | 7/1991 | Hansen et al. ........................... | 523/414 |
| 5,118,729 | 6/1992 | Piechocki ................................. | 523/404 |
| 5,204,385 | 4/1993 | Naderhoff ................................ | 523/417 |
| 5,319,004 | 6/1994 | Marten et al. ........................... | 523/404 |
| 5,369,152 | 11/1994 | Naderhoff et al. ....................... | 523/415 |
| 5,382,606 | 1/1995 | Butikofer ................................. | 523/404 |
| 5,489,630 | 2/1996 | Walker ..................................... | 523/404 |
| 5,643,976 | 7/1997 | Arora et al. ............................. | 523/404 |
| 5,741,835 | 4/1998 | Stark ....................................... | 523/403 |
| 5,750,595 | 5/1998 | Arora et al. ............................. | 523/404 |
| 5,786,429 | 7/1998 | Allen ....................................... | 525/430 |

FOREIGN PATENT DOCUMENTS

| | | | |
|---|---|---|---|
| 0717063 A2 | 6/1996 | European Pat. Off. ........ | C08G 69/40 |
| 06287276A | 10/1994 | Japan .............................. | C08G 59/50 |
| 1131543 | 10/1968 | United Kingdom ........... | C08G 43/02 |

*Primary Examiner*—Robert E. L. Sellers
*Attorney, Agent, or Firm*—Yukiko Iwata

[57] ABSTRACT

A water-compatible curing agent for epoxy resins is prepared by (a) reacting at least one polyamine having at least 3 active amine hydrogen atoms per molecule and at least one epoxy resin in an epoxy equivalent to polyamine mole ratio of from 0.9:1 to 1:10 to obtain an amine-terminated intermediate; (b) reacting the amine-terminated intermediate with from 0.5 to 25 weight percent, based on the amine-terminated intermediate, of an acid-terminated polyalkylene glycol to yield an amine-terminated curing agent. The amine-terminated intermediate can be capped with a monoepoxide in an amine hydrogen atoms to epoxy groups ratio of from about 1.5:1 to 30:1 prior to reaction with the acid-terminated polyalkylene glycol, or the amine-terminated curing agent produced following step (b) can be capped with a monoepoxide.

45 Claims, No Drawings

EPOXY RESIN CURING AGENT-REACTING ACID-TERMINATED POLYALKYLENE GLYCOL WITH EXCESS AMINE-TERMINATED POLYAMINE-EPOXY RESIN ADDUCT

This application claims the benefit of U.S. Provisional Application No. 60/065,340, filed Nov. 13, 1997.

FIELD OF INVENTION

This invention relates to curing agents for epoxy resins. In one aspect, the invention relates to curing agents suitable for use in waterborne applications.

BACKGROUND OF THE INVENTION

Epoxy coating systems cured with polyamine-based curing agents are used for the preparation of industrial maintenance coatings and other types of protective coatings for a variety of substrates. Epoxy resins have excellent resistance to chemicals also have good adhesion to most substrates, e.g. various woods, wall-boards, metals and masonry surface.

There has long been a desire to formulate a curing agent which is essentially free of volatile organic compounds (VOC's), which are self emulsifiable and curable at a wide range of temperatures in the absence of external accelerators if possible.

Many of the current waterborne epoxy resins and curing agents are plagued with the problem of poor film properties because the surfactants tend to migrate to the surface during the cure of the resin system. Thus, it would be desirable to provide a curing agent system containing a surfactant which does not migrate during cure, that is, a water compatible system which does not require salting the surfactant, e.g. with acids, or using plasticizers to form a stable dispersion of the curing agent in water.

Water compatible curing agents can be soluble (homogenized), dispersible (oil-in-water dispersions), or provide water-in-oil dispersions.

In addition to providing a water compatible curing agent, the curing agent should be readily compatible with a waterborne epoxy resin in order to make a coating having good mechanical and resistance properties. A waterborne curing agent that does not have good compatibility with the epoxy resin will coalesce poorly when applied onto a substrate. The problem of compatibility is more acute where the curing agent primary amine groups have been converted to secondary amine groups to reduce the blooming or hazing phenomena due to carbamation.

It is desirable to obtain curing agents that are water compatible and provide cured products with good mechanical and resistance properties

SUMMARY OF THE INVENTION

A curing agent for epoxy resins comprising a reaction product prepared by the steps comprising
(a) reacting at least one polyamine having at least 3 active amine hydrogen atoms per molecule and at least one epoxy resin having a functionality of at least 1.5 in an epoxy functionality equivalents to polyamine mole ratio of 0.9:1 to 1:10 thereby producing an amine-terminated intermediate;
(b) reacting the amine-terminated intermediate with 0.5 to 25 weight percent, based on the amine-terminated intermediate, of an acid-terminated polyalkyleneglycol-containing compound having the formula:

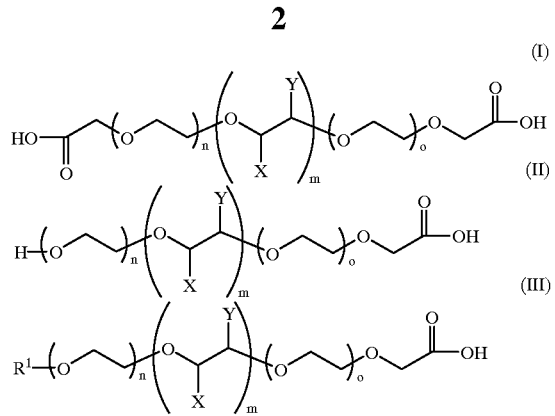

wherein $R^1$ is an alkyl, aryl, or arylalkyl group having 1 to 15 carbon atoms, X and Y are independently a hydrogen, methyl or ethyl group with the provision that if X is methyl or ethyl, Y is hydrogen or if Y is methyl or ethyl, X is hydrogen, and n+m+o is a real number from about 100 to about 200, and n+o is at least 70 percent of n+m+o, in an a ratio of (I) to (II) by weight in the range of 100:0 to 0:100, a ratio of (I) to (III) by weight in the range of 100:0 to 0:100, and in a ratio of (II) to (III) by weight in the range of 100:0 to 0:100, until essentially all of the acid group is consumed, thereby producing the amine-terminated curing agent.

Such amine-terminated curing agent can also be capped with a monoepoxy to provide a capped amine curing agent of the invention.

Also provided is a curing agent for epoxy resins comprising a reaction product prepared by the steps comprising
(a) reacting at least one polyamine having at least 3 active amine hydrogen atoms per molecule and at least one epoxy resin having a functionality of at least 1.5 in an epoxy functionality equivalents to polyamine mole ratio of 0.9:1 to 1:10 thereby producing an amine-terminated intermediate;
(b) reacting the amine-terminated intermediate with a monoepoxy in an amine hydrogen atoms to epoxy groups ratio of 1.5:1 to 30:1 to provide a capped amine-terminated intermediate;
(c) reacting the capped amine-terminated intermediate with 0.5 to 25 weight percent, based on the capped amine-terminated intermediate, of an acid-terminated polyalkyleneglycol-containing compound having the formula:

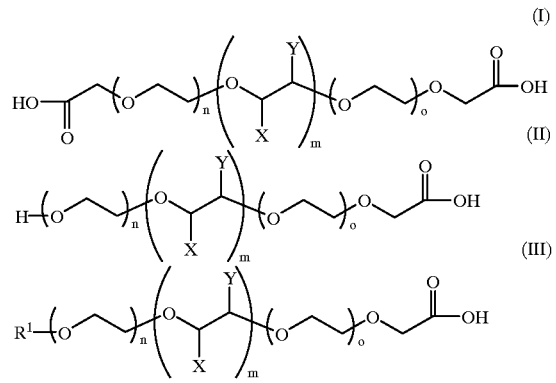

wherein $R^1$ is an alkyl, aryl, or arylalkyl group having 1 to 15 carbon atoms, X and Y are independently a hydrogen, methyl or ethyl group with the provision that if X is methyl or ethyl, Y is hydrogen or if Y is methyl or ethyl, X is hydrogen, and n+m+o is a real number from about 100 to about 200, and n+o is at least 70 percent of n+m+o, in an a ratio of (I) to (II) by weight in the range of 100:0 to 0:100, a ratio of (I) to (III) by weight in the range of 100:0 to 0:100, and in a ratio of (II) to (III) by weight in the range of 100:0 to 0:100, until essentially all of the acid group is consumed, thereby producing the capped amine-based curing agent.

DETAILED DESCRIPTION OF THE INVENTION

There has been found that a certain amine adduct curing agent containing polyetheramidoamine moiety is compatible in water without an acid, thus providing a superior curing agent for waterborne epoxy coatings formulations. Further, the curing agent of the invention requires only small amounts of surfactant based on solids. The curing agents of this invention when combined with a solid or liquid epoxy aqueous dispersion give coatings with good impact resistance, high gloss and/or gloss retention.

The waterborne curing agent composition of the invention can be soluble in water or dispersed in water (oil-in-water dispersion where the continuous phase comprises water and the solid phase comprises the curing agent composition) or water can be dispersed in the curing agent (water-in-oil dispersion where the continuous phase comprises the curing agent). The dispersion can be a suspension, emulsion, or a colloidal dispersion. The aqueous phase can contain other liquids in admixture, but is preferably free of any VOC's and free of any cosolvents. By an aqueous phase that is essentially free of VOC's is meant that 5 wt. % or less, preferably less than 1 wt. % of the waterborne curing agent composition is a VOC.

For illustrative purposes, one embodiment of the curing agent of the invention can be represented as an amine-terminated curing agent having the simplified formula:

wherein $R^1$ is an alkyl, aryl, or arylalkyl group having 1 to 15 carbon atoms, $R^2$ and $R^3$ are independently aliphatic, cycloaliphatic, or aromatic group having 2 to 18 carbon atoms optionally containing non-reactive oxygen or at most an average of 4 secondary and/or tertiary nitrogen atoms per structure in the backbone, X and Y are independently a hydrogen, methyl or ethyl group with the provision that if X is methyl or ethyl, Y is hydrogen or if Y is methyl or ethyl, X is hydrogen, and n+m+o is a real number from about 100 to about 200, and n+o is at least 70 percent, preferably 90 percent, of n+m+o. These curing agents preferably can be end capped with an monoepoxy by reacting the epoxy groups of the monoepoxy with at least a portion of the remaining primary or secondary amine groups.

For illustrative purposes, another embodiment of the curing agent of the invention can be represented as an amine-terminated curing having the simplified formula:

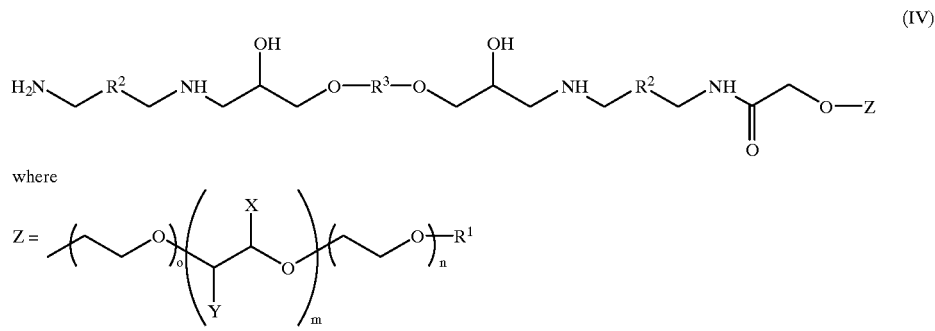

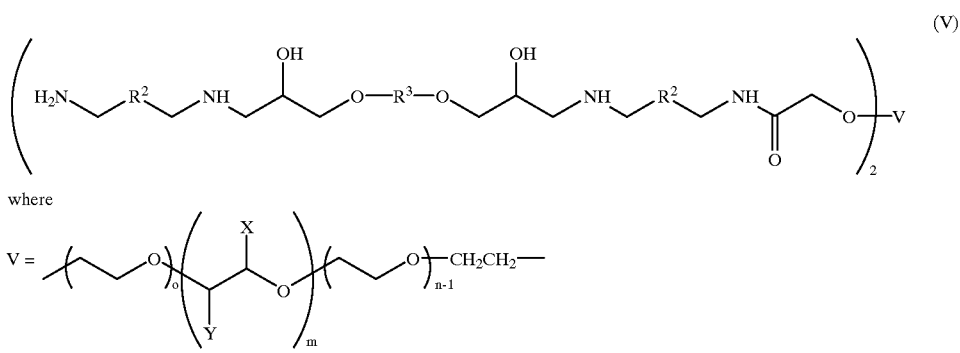

wherein $R^2$, $R^3$, X, Y n, m, and o are as described above. As the above structure, these curing agents preferably can be end capped with an monoepoxy by reacting the epoxy groups of the monoepoxy with at least a portion of the remaining primary or secondary amine groups.

For further illustrative purposes, another embodiment of the curing agent of the invention can be represented as an amine-terminated curing agent having the simplified formula:

(VI)

$$Z-O-CH_2-C(=O)-N(...)...$$

where $$Z = -(-CH_2CH_2-O-)_o-(-CHX-CHY-O-)_m-(-CH_2CH_2-O-)_n-R^1$$

wherein $R^1$, $R^2$, $R^3$, X, Y, n, m, and o are as described above, and $R^4$ is alkyl, aryl, or arylalkyl group having 1 to 15 carbon atoms.

For further illustrative purposes, another embodiment of the curing agent of the invention can be represented as an amine-terminated curing agent having the simplified formula:

(VII)

$$\left( V-O-... \right)_2$$

where $$V = -(-CH_2CH_2-O-)_o-(-CHX-CHY-O-)_m-(-CH_2CH_2-O-)_{n-1}-CH_2CH_2-$$

wherein $R^2$, $R^3$, X, Y, n, m, and o are as described above, and $R^4$ is alkyl, aryl, or arylalkyl group having 1 to 15 carbon atoms.

One embodiment of the above curing agents can be prepared by reacting an amine-terminated compound represented by the simplified formula:

(VIII)

$$H_2N-R^2-NH-CH_2-CH(OH)-CH_2-O-R^3-O-CH_2-CH(OH)-CH_2-NH-R^2-NH_2$$

wherein $R^2$ and $R^3$ are as described above, with an acid-terminated polyalkyleneglycol-containing compound having the formula:

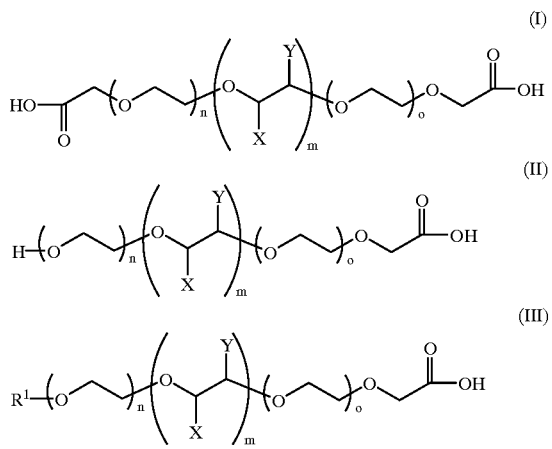

wherein $R^1$, X, Y, n, m, and o are as described above in an amine hydrogen to carboxyl group ratio of about 100:1 to about 1000:1, in an a ratio of (I) to (II) by weight in the range of 100:0 to 0:100, a ratio of (I) to (III) by weight in the range of 100:0 to 0:100, and in a ratio of (II) to (III) in the range of 100:0 to 0:100 until essentially all of the acid group is consumed, thereby producing the amine-terminated curing agent. These curing agents can then be end-capped to provide an end-capped amine-based curing agent.

In another embodiment of the curing agent, the curing agents can be prepared by reacting the above amine-terminated compound which can be represented by formula VIII with at least one monoepoxy, then reacted with at least one acid-terminated polyalkyleneglycol-containing compound as represented above.

In one embodiment, the curing agent can be prepared by reacting the acid-terminated polyalkyleneglycol-containing compound of structures (I) and (II) in a ratio of (I) to (II) by weight in the range of 99:1 to 1:99, preferably in the range of 20:80 to 80:20, and at least one amine-terminated compound. In another embodiment, the curing agent can be prepared by reacting the acid-terminated polyalkyleneglycol-containing compound of structures (II) and (III) in a ratio of (II) to (III) by weight in the range of 99:1 to 1:99, preferably in the range of 20:80 to 80:20, and at least one amine-terminated compound. In yet another embodiment, the curing agent can be prepared by reacting the acid-terminated polyalkyleneglycol-containing compound of structures (I) and (III) in a ratio of (I) to (III) by weight in the range of 99:1 to 1:99, preferably in the range of 20:80 to 80:20, and at least one amine-terminated compound. Further, the curing agent can be prepared by reacting the acid-terminated polyalkyleneglycol-containing compound of structures (I), (II) and (III) in an amount of 4 to 98 percent by weight of (I), 1 to 95 percent by weight of (II), and 1 to 95 percent by weight of (III) with at least one amine-terminated compound.

The acid-terminated polyalkyleneglycol-containing compound is contacted with the amine-terminated compound under conditions effective to react the amine group and the acid group. Typically, the acid-terminated polyalkyleneglycol-containing compound is present in an amount of 0.5 to 25 weight percent, preferably 1.5 to 8.0 weight percent, based on the amine-terminated intermediate. The amine hydrogen atoms to carboxyl group ratio of about 100:1 to about 1000:1 is preferred. The reaction is typically carried out at a temperature from ambient temperature to an elevated temperature sufficient to react the amine group and the acid group preferably in the range of from 150° C. to 200° C. for a time effective to produce the reaction products. The progress of the reaction can be monitored and targeted to produce the desired product by measuring the amine equivalent weight and the acid groups of the reactant mixture. Generally, the reaction mixture is heated until essentially all of the acid group is consumed, which is typically less than 5 mg. KOH/g, preferably less than 2 mg. KOH/g, of the acid group is remaining.

Of course, when a multifunctional epoxy resin is used in place of a difunctional epoxy resin to produce the amine-terminated compound of formula (VIII), the $R^3$ group will have more than two epoxy residue groups which can react with the polyamines. In order to simplify the illustration those curing agents using the multifunctional epoxy resin or a polyamine having more than 4 amine hydrogen functionality is not illustrated as the structure, but are included in the invention.

The amine-terminated compound of formula (VIII) and the multifunctional equivalents can be produced by reacting an epoxy resin with an excess of the polyamine under conditions effective to react the amine group and the epoxide group to produce an amine-terminated product.

The reaction is typically carried out at a temperature from ambient temperature to an elevated temperature sufficient to react the amine group and the epoxide group preferably within the range of from about 60° C. to about 120° C. for a time effective to produce the reaction products. The progress of the reaction can be monitored and targeted to produce the desired product by measuring the amine equivalent weight and the epoxy equivalent weight of the reactant mixture. Generally, the reaction mixture is heated until the epoxy equivalents are consumed.

If desired, the amine-terminated curing agent product can be reacted with a monoepoxy in a remaining active amine hydrogen atoms to epoxy groups ratio in the range from 1.5:1, preferably from 2:1 to 20:1, preferably to 10:1, to provide a capped product.

The amine-terminated product can be capped with a monoepoxy by reacting the compounds under conditions effective to react the remaining active amine hydrogen atoms with the epoxy groups either before or after emulsification. The reaction is typically carried out at a temperature within the range from about 60° C. to about 120° C. for a time effective to produce the reaction products. Generally, the reaction mixture is heated until the epoxy equivalents are consumed.

Alternatively, the amine-terminated intermediate (amine-terminated compound) is first at least partially capped then reacted with the acid-terminated polyalkyleneglycol-containing compound in a similar manner.

The preferred polyamine can be represented by the formula:

wherein $R^2$ is aliphatic, cycloaliphatic, or aromatic group having 2 to 18 carbon atoms optionally containing non-reactive oxygen or at most an average of 4 atoms in the backbone. Examples of suitable diamines include, for example, m-xylylenediamine, 1,3-bisaminomethylcyclohexane, 2-methyl-1,5-pentanediamine, 1-ethyl-1,3-propanediamine, ethylenediamine, diethylenetriamine (DETA), triethylenetetramine (TETA), polyoxypropylenediamines, 2,2(4),4-trimethyl-1,6-hexanediamine, isophorone diamine, 2,4(6)-toluenediamine, 1,6-hexanediamine, 1,2-diaminocyclohexane and para-aminodicyclohexyl methane (PACM).

The acid-terminated polyalkyleneglycol-containing compound can be produced by oxidation of a polyethylene glycol monoalkylether or a monoalkylether of a block copolymer of ethylene oxide and propylene oxide or butylene oxide ("polyalkylene glycol") or by at least a partial oxidation of a polyethylene glycol, or a block copolymer of ethylene oxide and propylene oxide or polybutylene oxide ("polyalkylene glycol").

Polyalkylene glycols generally contain a distribution of compounds with a varying number of oxyethylene units, n or o and/or oxypropylene or oxybutylene units, m. Generally, the quoted number of units is the whole number closest to the statistical average, and the peak of the distribution. Positive real number as used herein refers to a number which is positive and includes integers and fractions of integers.

The acid-terminated polyalkyleneglycol-containing compounds can be produced by oxidation of the polyalkylene glycols including, but not limited to, the processes described in U.S. Pat. Nos. 5,250,727 and 5,166,423. Generally, oxygen-containing gas is added to the polyalkylene glycol in the presence of a free radical (e.g., 2,2,6,6-tetramethyl-1-piperidinyloxy) and an inorganic acid (e.g., nitric acid) to produce the carboxylic acid until at least one hydroxyl group per molecule, or if diacid-terminated polyalkyleneglycol is desired substantially all of the alcohol groups, are oxidized to carboxylic acid groups. Acid-terminated polyalkyleneglycol-containing compound can also be made by Williamson ether synthesis where a polyalkyleneglycol is reacted with chloroacetic acid and/or esters in the presence of a base.

The epoxy resins used in producing the curing agent can be any reactive epoxy resin having a 1,2-epoxy equivalency (functionality), on the average, at least 1.3, preferably at least 1.6, to preferably to about 8 epoxide groups, to preferably 5 epoxide groups per molecule. The epoxy resin can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include diglycidyl ethers of dihydric compounds, epoxy novolacs and cycloaliphatic epoxies. Suitable epoxy resins are disclosed in U.S. Pat. No. 5,602,193, the disclosure is hereby incorporated by reference. Generally epoxy resins contain a distribution of compounds with a varying number of repeat units.

Preferably the epoxy resin is a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols includes advancement products of the above diglycidyl ethers of dihydric phenols with dihydric phenols such as bisphenol-A, such as those described in U.S. Pat. Nos. 3,477,990 and 4,734,468, which are herein incorporated by reference.

Diglycidyl ethers of hydrogenated dihydric phenols can be produced, for example, by hydrogenation of dihydric phenols followed by glycidation reaction with an epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. The aliphatic diol can be linear or branched or substituted with oxygen in the backbone. Examples of suitable aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane.

Epoxy novolacs can be produced by condensation of formaldehyde and a phenol followed by glycidation by reaction of an epihalohydrin in the presence of an alkali. The phenol group of the phenoxymethylene units of the epoxy novolac can be non-substituted, partially substituted or substituted up to three substitution with an alkyl group having 1 to 10 carbon atoms. The phenol can be for example, phenol, cresol, nonylphenol and t-butylphenol. Epoxy novolacs generally contain a distribution of compounds with a varying number of glycidated phenoxymethylene units, r, where r is generally 2 to 8. Generally, the quoted number of units is the number closest to the statistical average, and the peak of the distribution.

Cycloaliphatic epoxies can be produced by epoxidizing a cycloalkene-containing compound with greater then one olefinic bond with peracetic acid. Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy) cyclohexyl-5,5-spiro(3,4-epoxy)-cyclohexane-m-dioxane], bis(3,4-epoxycyclohexylmethyl)adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

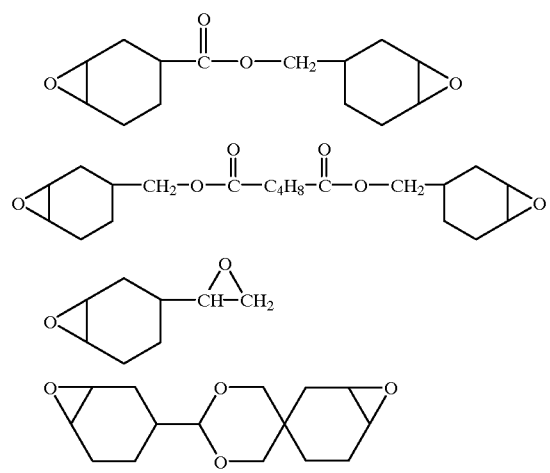

Commercial examples of preferred epoxy resins include, for example, EPON® Resins DPL-862, 828, 826, 825, 1001, 1002, EPONEX® Resin 1510, HELOXY® Modifiers 32, 44, 48, 56, 67, 68, 71, 84, 107, 505, EPON® Resin DPS155, and EPON® Resin HPT 1050 all available from Shell Chemical Company, Dow Chemical Epoxy Resin DEN 431 and Union Carbide Epoxy Resins ERL-4221, -4289, -4299, -4234 and -4206.

The monoepoxide capping agent can be an aliphatic, alicyclic, or aromatic compound attached to the epoxy functional group. Reacting the primary amine hydrogen reduces the chance for carbamate formation from atmospheric moisture reacting with the primary amine hydrogens, appearing as a blush on the coating and leading to chain scission. In addition to reducing the effect of blushing by reacting out some or all of the primary amine groups on the substituted aryl amidopolyamine, reacting the amidopolyamine with a epoxy functional group has the advantage of leaving the one free amine hydrogen active for reaction with epoxy groups. Reacting the primary amine on the amidopolyamine compound with a epxoy functionality, however, leaves the secondary amine hydrogen more active for reaction with an epoxy resin. Thus, one can achieve the dual advantage of reducing blush while retaining sufficient reactivity to cure the system at ambient temperatures in the absence of external catalysts. Reaction with a monoepoxide capping agent also leads to the formation of a hydroxyl group, which would also be available to react with the epoxy component.

Preferred examples of monoepoxide capping agents which are suitable for use in the invention include:

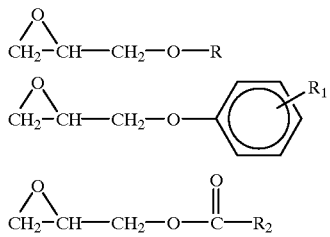

wherein R and $R_2$ are the same or different and are a branched or linear alkyl, an alkalicyclic, polyoxyalkyl, or alkenyl group having 2–100 carbon atoms, optionally branched; and $R_1$ is hydrogen, halogen or a branched or unbranched alkyl having 1–18 carbon atoms. There may be more than one type of $R_1$ group attached to the aromatic ring.

These categories would include the unsaturated epoxy hydrocarbons of butylene, cyclohexene, styrene oxide and the like; epoxy ethers of monovalent alcohols such as methyl, ethyl, butyl, 2-ethylhexyl, dodecyl alcohol and others; epoxides of the alkylene oxide adducts of alcohols having at least 8 carbon atoms by the sequential addition of alkylene oxide to the corresponding alkanol (ROH), such as those marketed under the Neodol® name; epoxy ethers of monovalent phenols such as phenol, cresol, and other phenols substituted in the o-, m-, or p- positions with $C_1$–$C_{21}$ branched or unbranched alkyl, aralkyl, alkaryl, or alkoxy groups such as nonylphenol; glycidyl esters of monocarboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, hereby incorporated by reference; epoxy esters of unsaturated alcohols or unsaturated carboxylic acids such as the glycidyl ester of neodecanoic acid, epoxidized methyl oleate, epoxidized n-butyl oleate, epoxidized methyl palmitoleate, epoxidized ethyl linoleate and the like; phenyl glycidyl ether; allyl glycidyl ethers, and acetals of glycidaldehyde.

Specific examples of monoepoxide capping agents useful to the practice of the invention include alkyl glycidyl ethers with 1–18 linear carbon atoms in the alkyl chain such as butyl glycidyl ether or a mixture of $C_8$–$C_{14}$ alkyls, cresyl glycidyl ether, phenyl glycidyl ether, nonylphenylglycidyl ether, p-tert-butylphenyl glycidyl ether, 2-ethylhexyl glycidyl ether, and the glycidyl ester of neodecanoic acid.

The curing agent of the invention can be useful to cure an liquid or a solid epoxy resin, neat, in organic solvents or in water. Any epoxy resin mentioned above to produce the curing agent of the invention can be cured by the curing agent of the invention. The curing agent can be useful for ambient coating applications as well as bake coating applications. The cure temperature can vary depending on the application, typically in the range of 5° C. to 200° C.

Further, the curing agent of the invention can be dispersed or solubilized in an aqueous solution. Such solution, emulsion or dispersion contains water and the curing agent of the invention. Such composition can be provided by mixing the water in the curing agent of the invention with or without the presence of a surfactant. Any conventional surfactant useful for emulsification or dispersion of curing agents in aqueous solutions can be used. Examples of such surfactant are surfactants based on polyalkylene oxide blocks such as Carbowax 8000, Pluronic 88, Novepox Tan 117 and Jeffamine ED2001. However, the curing agents of the invention are self-emulsifiable and do not need any additional surfactant (s) to provide the aqueous curing agent solution, emulsion or dispersion.

These curing agents of the invention can be used to effectively cure an aqueous epoxy resin system. Preferred examples of the aqueous epoxy resins are bisphenol-A based epoxy resins having from 350 to 10,000 molecular weight nonionically dispersed in water with or without glycol ether cosolvents. Commericial examples of the aqueous epoxy resins include, for example, EPI-REZ® Resin 3520, 3522, 3540 and 5522 available from Shell Chemical Company. The curing agents of the invention are compatible with aqueous dispersions without using acid salts. These curable systems contain, water, one or more epoxy resins and one or more curing agents of the invention. These aqueous curable epoxy resin systems can be cured at room temperature or at elevated temperatures or further catalyzed with a commercially available tertiary amine accelerator, such as 2,4,6-tris (dimethyl aminomethyl phenol) or phenols to cure at lower temperatures. Examples of such materials are EPI-CURE® Curing Agent 3253 from Shell Chemical Company or DMP-30 from Rohm and Haas. These low temperatures typically range from 5° C. to 20° C. For the aqueous epoxy resin systems, the typical cure temperature with or without an accelerator ranges from 5° C. to 45° C. Typically these curing agents are used to formulate thermoset coatings that have good corrosion protection of the coated substrate.

These aqueous epoxy resin systems can serve as components of paints and coatings for application to substrates such as, for example, metal and cementitious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and is generally recognized by those skilled in the art.

The curing agents of the instant invention can also be used as components of adhesives and fiber sizing.

Illustrative Embodiment

EPON* 828 is a diglycidyl ether liquid epoxy resin, commercially available from Shell Chemical Company EPON* 1001-x-75: is a xylene solution of a solid diglycidyl ether epoxy resin, commercially available from Shell Chemical Company DEN 438-T-70: is an epoxy phenolic novolak resin in a toluene solution, commercially available from Dow Chemical EPON* HPT 1050: is an epoxy phenolic novolak resin available from Shell Chemical Company.

TETA: is triethylene tetramine commercially available from Union carbide having a typical amine value of about 1436 mg KOH/g DYTEK A: is 2-methyl-pentyl diamine commercially available from Dupont having a typical amine value of about 943 mg KOH/g HELOXY* Modifier 62: is a commercial grade of ortho-cresol glycidyl ether available by Shell Chemical Company, that is produced by treatment of ortho-cresol with epichlorohydrin and sodium hydroxide. HELOXY Modifier is a thin liquid having a viscosity at 25° C. of about 7 centipoise and an epoxy equivalent weight of about 175 to about 195.

CARDURA* Resin E10: is the glycidyl ester of a synthetic saturated monocarboxylic acid, commercially available from Shell Chemical Company. CARDURA E10 is a thin liquid having a viscosity at 25° C. of about 7.1 centipoise and an epoxy equivalent weight of about 250.

EPI-REZ* Resin 3520 (an aqueous epoxy resin dispersion of diglycidylether of bisphenol-A having EEW of 535) available from Shell Chemical Company.

EPI-REZ* Resin 5522 (an aqueous modified epoxy resin dispersion of diglycidylether of bisphenol-A having EEW of 625) available from Shell Chemical Company.

*Registered in U.S. Patent and Trademark Office.

The following illustrative embodiments describe the novel curing agent composition of the invention and are provided for illustrative purposes and are not meant as limiting the invention.

EXAMPLE 1

Step 1: A solution of 187 grams of toluene and EPON Resin 828 (187 grams, 1.0 eq.) were added to an excess of meta-xylenediamine(MXDA) at 100° C. The mixture was maintained at 100° C. for five hours; then toluene was removed and the excess of MXDA recovered. The product possessed an amine equivalent weight of 155.

Step 2: The product of step 1 (229.5 grams, 1.48 eq.) and 50 grams (0.0105 eq.) of an alpha-(2-carboxymethyl)-omega-methoxy-poly(oxy-1,2-ethanediyl) (methoxy PEG acid) of 4762 equivalent weight were reacted at 200° C. in a nitrogen atmosphere for four hours. The product was cooled to 100° C.; then, 220.5 grams (1.47 eq.) of phenyl glycidyl ether were added at a rate to maintain the temperature below 140° C. The temperature was held at 100° C. for two hours after completion of addition, after which time the product was isolated. It possessed an amine equivalent weight of 359.

Step 3: The curing agent from step 2 (400 grams) and 44.4 grams of toluene were added to glass reactor and stirred until homogenous at 87–96° C. Water (111.2 grams) was then added at 80° C. while stirring at a constant rate of 200 RPM. At the end of the addition, the mixture inverted to an oil-in-water emulsion. After stirring for one hour at 75° C., a second portion (26.2 grams) of toluene was added, followed by 187.6 grams of water. The resultant emulsion, approximately 50% solids, had a viscosity of 7240 cp and a number average particle size of 0.431 microns.

EXAMPLE 2

The same procedure used in the example 1 was used to prepare this composition. 285.0 g of EPON Resin 828/MXDA reaction product was used to react with 24.0 g of 5000 mw methoxy PEG acid and then capped with 91.0 g of phenyl glycidyl ether. After dispersing in the water, the particle size of the emulsion was determined to be 0.53 microns.

EXAMPLE 3

The same procedure used in the example 1 was used to prepare this composition. 405.0 g of EPON Resin HPT-1050/Dytek A reaction product was used to react with 400 g of 5000 mw Methoxy PEG acid and then capped with 173 g of Heloxy 62. After dispersing in the water, the particle size of the emulsion was determined to be 0.49 microns.

EXAMPLES 4–10

For Example 6 the following procedure was used to provide an curing agent composition of the invention.

Scheme 1a

This example illustrates the synthesis of a self emulsifiable waterborne curing agent composition containing a coreacted surfactant. In the first stage an isolated amine adduct based on a resin solution (EPON Resin 828-X-90) and an aliphatic amine (Dytek A) is made and is subsequently this product is reacted with an acid-terminated polyalkyleneglycol and subsequently reacted with a monoglycidylether (HELOXY Modifier 62). This amine adduct is then dispersed into water.

Detailed Procedure

A 4 necked round-bottomed glass flask was equipped with a condenser having a water trap, a nitrogen inlet, a resin solution inlet and the amine inlet. The flask was flushed with nitrogen.

The amine (Dytek A) (356.94 g) was charged into the reactor and heated to 93 deg C. At 93 deg C. a metered addition of the resin solution (212.48 g)to the amine was started at such a rate that the temperature of the reaction mixture did not exceed 121 deg C.

After completion of the addition, the mixture is kept at 93 deg C. for additional 60 minutes. Excess diamine and xylene were distilled off at about 140° C. under about 1.5 mmHg. The reaction product had an amine value of about 340.94 mg KOH/g (theoretical calculated value is 361.6 mg KOH/g).

Subsequently the reaction mixture was cooled to 121° C. and 39.38 g of surfactant (in solid form), representing a final surfactant level of about 8% on solids resin weight, were charged into the flask and heated to about 200° C. for 2 hours. The acid value of the reaction mixture was measured after 2 hours of reaction and a value of 2.29 mg KOH/g was found indicating that the reaction was completed.

Subsequently the reaction mixture was cooled to 93° C., after which 179.5 g of Heloxy 62, representing about 1 equivalent, were added to the reaction vessel at a rate such that the maximum temperature did not exceed 121° C. After completion of the addition, the reaction was held at 93° C. for 60 minutes. The reaction mixture was allowed to cool to about 78° C. Water was dropwise added until the reaction mixture was inverted from a water in oil to an oil in water emulsion. The inversion occurred at about 72% solids and a temperature of 50° C. Further water was added to a total amount of 529.16 g to obtain a final solids content of 50% by weight. The average particle size was 0.3μ.

Further properties of this product are given in the Table 3 below.

For Examples 4, 5, 7, 8, 9, and 10, a similar process was used as in Example 6.

In tables 1 and 2 the different resins, amines and acid-terminated polyalkyleneglycols that were used are listed together with the exact amounts that were used during the preparation.

The properties of the different end products are listed in Tables 3 and 4.

The following ASTM methods were employed for the corresponding tests:

| Test | ASTM or Method |
|---|---|
| Viscosity, Brookfield viscosity | D 2196 |
| Application viscosity, Stormer Krebs | D 562 |
| Film Hardness, pencil hardness | D 3363 |
| Solids Content | D 2369 |
| Specular Gloss | |
| Clear Films | D 1308 |
| Pigmented systems | D 4540 |
| Cure rate, drying time | D 1640 |
| Gloss/potlife | D 1308 |
| Film Thickness | B 499D measured with a Positector 6000 film thickness gauge |
| Impact resistance | D 2794-84 |
| Flexibility, Conical mandril | D 522 |
| Hegman, fineness of grind | D 1210-79 |
| Acid Value | D 1639 |
| Adhesion, X-cut | D 3359 |
| Chemical resistance (24 hours spot testing) | D 1308 |

Particle Size

The determination of emulsion and dispersion particle sizes was accomplished with a Brookhaven Bi-DCP Particle Sizer from Brookhaven Instruments Corporation. Dn is number average particle size and Dw is mass average particle size. All particle size data is reported in microns, $\mu$. Unless otherwise stated the particle sizes quoted for the dispersions herein are reported as Dn, number average particle size.

Weight per Epoxide

The weight per epoxide (WPE or EEW) of all products was determined by drying a weighed amount of sample by means of azeotropic distillation with methylene chloride then titrating the residue by known methods and correcting for percent solids to determine the WPE at 100% solids content.

Amine Value

Defined as the milligrams of KOH equivalent to basic nitrogen content of a one-gram sample, determined by acid base titration.

Amine Eq. Wt.

Is defined as the weight required to react with one equivalent weight of epoxide and is determined from the amine nitrogen content in Shell Test Method HC-715-88 and the known stoichiometry of the reactants in the resulting product containing nitrogens with hydrogens that will react with epoxies under ambient conditions.

TABLE 1

| | Example 4 (grams) | Example 5 (grams) | Example 6 (grams) | Example 7 (grams) |
|---|---|---|---|---|
| Resin: | | | | |
| EPON 828-x-90 | 212.48 | | 212.48 | |
| DEN 438-T-70 | | 264.28 | | 264.28 |
| EPON 1001-X-75 | | | | |
| HPT 1050-T-70 | | | | |

TABLE 1-continued

| | Example 4 (grams) | Example 5 (grams) | Example 6 (grams) | Example 7 (grams) |
|---|---|---|---|---|
| Amine: | | | | |
| TETA | | | | |
| Dytek A | 356.94 | 356.94 | 356.94 | 356.94 |
| End-Capping agent: | 180.49 | 180.52 | 179.5 | 179.54 |
| HELOXY 62 | | | | |
| Acid-terminated polyalkyleneglycol: | | | | |
| 1* | 39.38 | 38.88 | | |
| 2** | | | 39.38 | 36.88 |
| water: | 530.15 | 523.38 | 529.16 | 522.4 |

*1 = Methoxy PEG Acid of around 5000 Mw (weight average) (monofunctional)
**2 = PEG acid from PEG diol of around 4600 Mw (weight average)

TABLE 2

| | Example 8 (grams) | Example 9 (grams) | Example 10 (grams) |
|---|---|---|---|
| Resin: | | | |
| EPON 828-x-90 | 212.48 | | |
| DEN 438-T-70 | | | |
| EPON 1001-X-75 | | | 670 |
| HPT 1050-T-70 | | 261.97 | |
| Amine: | | | |
| TETA | 468.72 | 468.72 | 468.72 |
| Dytek A | | | |
| End-Capping agent: | 178.81 | 178.96 | 176.5 |
| Heloxy 62 | | | |
| Acid-terminated polyalkyleneglycol: | | | |
| 1* | | | |
| 2** | 44.06 | 41.81 | 80.63 |
| Deionised water: | 570.41 | 561.41 | 882.37 |

*1 = Methoxy PEG Acid of around 5000 Mw (weight average) (monofunctional)
**2 = PEG acid from PEG diol of around 4600 Mw (weight average)

TABLE 3

| | Example 4 | Example 5 | Example 6 | Example 7 |
|---|---|---|---|---|
| Amine value(BOS) mg KOG/g | 212.6 | 223.7 | 212.08 | 231.82 |
| Acid Value (BOS) | 1.57 | 2.35 | 2.29 | 2.38 |
| % solids | 49.01 | 49.6 | 52.5 | 49.67 |
| Viscosity (at 25° C.) | 10,040 | 4,740 | 14,360 | 1.740 |
| Particle size, Dn (ave.) | 0.243 | 0.412 | 0.287 | 0.401 |
| Amine Eq. Wt. (calc) | 248.1 | 244.88 | 249.29 | 246.05 |
| AHEW, g/eq. (calc) | 248.1 | 244.88 | 249.29 | 246.05 |
| Hegman at 9:1 | 4.75C | 6C | 8A | 8A |
| % end-capping | 100 | 100 | 100 | 100 |
| Surfactant level (basis resin solids) | 8 | 8 | 8 | 8 |
| % solids (theory) | 50 | 50 | 50 | 50 |

TABLE 4

| | Example 8 | Example 9 | Example 10 |
|---|---|---|---|
| Amine value(BOS) | not measured | 369.7 | 247.26 |
| Acid Value (BOS) | | 2.07 | 1.68 |
| % solids | | 44.2 | 43.7 |

TABLE 4-continued

|  | Example 8 | Example 9 | Example 10 |
|---|---|---|---|
| Viscosity (at 25° C.) |  | 21,200 | 26,400 |
| Particle size, Dn (ave.) |  | 0.305 | 0.308 |
| Amine Eq. Wt. (calc) |  |  |  |
| AHEW, g/eq. (calc) |  | 130 | 216 |
| Hegman at 9:1 |  | 130 | 216 |
|  |  | 8A | 8A |
| % end-capping | 100 | 100 | 100 |
| Surfactant level (basis resin solids) | 8 | 4.67 | 4.6 |
| % solids (theory) | 50 | 50 | 50 |

EXAMPLE 11

Step 1: A solution of 85.7 grams of toluene and EPON® Resin 1001 (200.0 g) were added to an excess of triethylenetetraamine (TETA) (220.0 g) at 100° C. The mixture was maintained at 100° C. for five hours; then toluene was removed and the excess of TETA recovered. The product possessed an amine equivalent weight of 316. The resulting amine adduct was reacted with 88.6 g of CADURA Resin E-10 at 130° C. and then 21.7 g of 4600 mw PEG Acid at 200° C. After cooling, water was added at 80° C. to make an oil-in-water emulsion. The resulting emulsion, approximately 45% solid, had a number average particle size of 0.18 microns.

EXAMPLE 12

This product was made according to the procedure and composition of Example 11 up to the point of end capping the amine adduct with Cardura Resin E-10. At this point, the non end capped amine adduct was amidified with the 4600 mw PEG Acid to produce the curing agent product and then the resulting product was thinned with deionized water. The final product was completely water soluble and was still very viscous at 45% nonvolatiles in water.

EXAMPLES 13 and 14

For Example 14 the following procedure was used to provide an curing agent composition of the invention.

Scheme 1B

This example illustrates the synthesis of a self emulsifiable waterborne curing agent composition containing a coreacted surfactant. In the first stage an isolated amine adduct based on a resin solution (EPON 1001-X-75) and an aliphatic amine (TETA) is made and subsequently end-capped with a mono-functional glycidylether (Heloxy 62). This end-capped amine adduct was then reacted with an acid-terminated polyalkylene glycol (aqueous solution) which was dissolved in water at a solids content of 60 or 50% by weight.

This amine adduct is then dispersed into water.

Detailed Procedure

A 4 necked round-bottomed glass flask was equipped with a condensor having a water trap, a nitrogen inlet, a resin solution inlet and the amine inlet. The flask was flushed with nitrogen.

The amine (IETA) (852.01 g) was charged into the reactor and heated to 93° C. At 93 deg C. a metered addition of the resin solution (1217.89 g) to the amine was started at such a rate that the temperature of the reaction mixture did not exceed 121 deg C.

After completion of the addition, the mixture is kept at 93 deg C. for additional 60 minutes. Excess diamine and xylene were distilled off at about 140° C. under about 1.5 mmHg. The reaction product had an amine value of about 320.3 mg KOH/g.

Subsequently the reaction mixture was cooled to 80° C., after which 330.1 g of Heloxy 62, representing about 1.81 equivalent, were added to the reaction vessel at a rate such that the maximum temperature did not exceed 121° C. After completion of the addition, the reaction was held at 93° C. for 60 minutes.

The reaction mixture was cooled to 80° C. and the aqueous surfactant (nr.2 –81.14 g) was added quickly. Subsequently the reaction mixture was heated to about 200° C. and held for 2 hours to react the surfactant in and to remove water from condensation. The acid value of the reaction mixture was measured after 2 hours of reaction and a value of 1.3 mg KOH/g was found indicating that the reaction was completed.

The reaction mixture was allowed to cool to about 80° C. Water was added dropwise until the reaction mixture was inverted from a water in oil to an oil in water emulsion. The inversion occurred at about 70% solids and a temperature of 77° C. Further water was added to a total amount of 1518.85 g to obtain a final solids content of 50% by weight. The average particle size was 0.3μ.

Further properties of this product are given in the Table 6 below.

Example 13 was carried out in a similar manner, except the starting materials and amounts were used as indicated in Table 5 below.

TABLE 5

|  | Example 11 (grams) | Example 12 (grams) | Example 13 (grams) | Example 14 (grams) |
|---|---|---|---|---|
| Resin: |  |  |  |  |
| EPON 828-x-90 |  |  |  |  |
| DEN 438-T-70 |  |  |  |  |
| EPON 1001-X-75 |  |  |  | 1217.89 |
| EPON 1001-T-70 | 285.7 | 285.7 |  |  |
| HPT 1050-T-70 |  |  | 623 |  |
| Amine: |  |  |  |  |
| TETA | 220 | 220 | 1114.67 | 852.01 |
| Dytek A |  |  |  |  |
| End-Capping agent: |  | no END-CAP |  |  |
| Heloxy 62 |  |  | 425.58 | 330.10 |
| CARDURA E10 | 88.6 |  |  |  |
| Acid-terminated polyalkyleneglycol: |  |  |  |  |
| 1* | 21.7 | 21.7 | 101.67 | 81.14 (60%) |
| 2** |  |  |  |  |
| Deionised water: | 479.0 | 371.0 | 1294.2 | 1518.85 |

*1 = Methoxy PEG Acid of around 5000 Mw (weight average) (mono-functional)
**2 = PEG acid from PEG diol of around 4600 Mw (weight average)

TABLE 6

|  | Example 14 |
|---|---|
| Amine value(BOS) | 256.2 |
| Acid Value (BOS) | 1.3 |
| % solids | 43.75 |
| Viscosity (at 25° C.) | 1,580 Cpoise |
| Particle size, Dn (ave.) | 0.3 |
| Amine Eq. Wt. (calc) | 218.9 |
| AHEW, g/eq. (calc) | 218.9 |

TABLE 6-continued

|  | Example 14 |
| --- | --- |
| Hegman at 9:1 | 8A |
| % end-capping | 100 |
| % Surfactant level (basis resin solids including surfactant) | 3.1 |
| % solids (theory) | 50 |

Clear Lacquer Data with Commercial Available Epoxy Resin Dispersions

The above mentioned curing agents of the invention can be readily mixed with any commercially available epoxy dispersion and can be applied as coatings. In table 7 below an overview is given on the properties of 2 curing agents of the invention (example 6 and 7) cured with epoxy resin dispersion EPI-REZ Waterborne Resin 5522 or 3520.

TABLE 7

|  | Formulation 1 5522/Ex. 6 | Formulation 2 5522/Ex 7 | Formulation 3 3520/Ex 6 | Formulation 4 3520/Ex 7 | Std. Formulation ER5522/ EC8290 |
| --- | --- | --- | --- | --- | --- |
| Induction time, (minutes) | 30 | 30 | 30 | 30 | 30 |
| Eq. ratio, (epoxy:amine) | 1 to 1 | 1 to 1 | 1 to 1 | 1 to 1 | 1 to 1 |
| Application viscosity, (KU) | 70 KU | 70 KU | 70 KU | 70 KU | 70 KU |
| Application method | drawdown | drawdown | drawdown | drawdown | drawdown |
| DFT, mils (average) | 2 | 2 | 2 | 2 | 2 |
| Substrate | CRS | CRS | CRS | CRS | CRS |
| Cure conditions | 14d, 25° C., 50% RH | 14d, 25° C., 50% RH | 14d, 25° C., 50% RH | 14d, 25° C. 50% RH | 14d, 25° C., 50% RH |
| PERFORMANCE PROPERTIES DURING CURE Film Hardness: |  |  |  |  |  |
| 1 day | B | HB | HB | HB | HB |
| 3 days | F | F | HB | HB | F |
| 7 days | F | F | F | HB | F |
| Specular gloss(average) 60/20: |  |  |  |  |  |
| 1 day | 09.4/113.3 | 103.9/80.1 | 109.4/111.3 | 105.1/91.6 | 110/110 |
| 3 days | 108.6/111.2 | 102.9/77.8 | 109.3/112.3 | 102.9/87.6 | 110/109 |
| 7 days | 108.3/111.1 | 101.3/74.8 | 107.7/107.2 | 98.1/75.2 | 109/107 |
| Film cure rate, hours |  |  |  |  |  |
| soft gel | 0.5 | 0 | 2.5 | 0.5 | 1 |
| Hard gel | 4 | 1.75 | 6 | 1 | 2 |
| Mar resistance | 6 | 3 | 9 | 5 | 5 |
| Gloss potlife (60 deg.) hrs | >7 | >7 | 4 | 4 | >7 |
| Gloss potlife (20 deg) hrs | >7 | >7 | 4 | 3 | >7 |
| Performance prop. |  |  |  |  |  |
| Avg. Dry film thickness | 1.8 | 1.6 | 1.7 | 1.7 | 1.7 |
| Specular gloss, 60/20 | 108.3/111.8 | 100.7/72.0 | 104.7/106.9 | 68.5/95 | 108/111 |
| Film Hardness | F | F | H | F | H |
| Impact resistance, (in/lb): |  |  |  |  |  |
| direct | >160 | >160 | >160 | 100 | >160 |
| reverse | >160 | 152p 156f | >160 | 92 | 128 |
| Flexibility, inch % elongation | 32 | 32 | 32 | 32 | 32 |
| Adhesion, X-cut | A | 5A | 5A | 5A | 5A |
| MIBK resistance mins | 5 (B) | 5(B) | 5(HB) | 5(B) | 30(HB) |
| MEK resistance (#DR) | 25 | 60 | 33 | 55 | 112 |

TABLE 7-continued

|  | Formulation 1 5522/Ex. 6 | Formulation 2 5522/Ex 7 | Formulation 3 3520/Ex 6 | Formulation 4 3520/Ex 7 | Std. Formulation ER5522/ EC8290 |
|---|---|---|---|---|---|
| Chemical resistance (24 hours spot test) |  |  |  |  |  |
| 10% NaOH | 4 | 3 | 3 | 3 | 10 |
| 10% H2SO4 | 4 | 3 | 3 | 3 | 9 |

Preparation of Aqueous Epoxy Dispersion

Example A

To a 2 liter resin flask fitted with an agitator and automatic temperature control, were added in order, 90.91 g Arcosolv PE (propylene glycol monoethyl ether from Arco Chemical Co.), 50.47 g EPON Resin 828, 563.75 g of flaked EPON® Resin 1001 and 15.03 g Cardura® E-10 epoxy diluent. This batch was heated slowly with to 120° C. over 45 minutes and the agitator was then started. The batch was then allowed to cool to 100° C. After all the EPON® Resin 1001 was dissolved, 40.0 g of amidoamine surfactant (prepared from Dytek A amine and a partially carboxylated polyethylene glycol 4600) and 26.7 g deionized water were added to the batch. The batch was then allowed to cool to 93° C. over 20 minutes. Then, 81.6 g deionized water was added over 1 minute during which time the temperature was allowed to drop to 87° C. At this point the batch had inverted to form a resin in water emulsion. The batch was held for 12 hours at 65–34° C. Then the batch was diluted to 1,840 cP viscosity at 58.8% NV with deionized water over 1 hour and 40 minutes. The particle size of this dispersion was Dn average 0.741 and Dw average 1.271 microns.

Paint Formulation: White TiO$_2$ Enamel of Example 6 Curing Agent and the Experimental Epoxy Dispersion A This paint was prepared by first making a pigment paste of titanium dioxide in water using a commercial dispersant, Disperbyk 190 from Byk Chemie, 0.3% based on pigment weight. This pigment paste was added to the epoxy dispersion prepared above in an amount to obtain a pigment to resin loading of 0.8 to 1.0 along with an appropriate amount of the phenyl ether of propylene glycol and allowed to deair overnight (8% of the weight of the epoxy dispersion). The next day the Example 6 curing agent and the pigmented epoxy dispersion were combined at a one to one amine hydrogen to epoxy and after approximately 30 minutes the resulting paint was spray applied to iron phosphate treated cold rolled steel test panels. After one week cure at 77 degree F. and 50% relative humidity the following paint properties were measured.

| Paint Property | Aqueous Resin/ Example 6 | Epi-Rez Resin 5522/ Epi-Cure CA 8290 #1804 |
|---|---|---|
| Dry Film Thickness | 2.4 mil | 1.7 |
| Pencil Hardness | H | F |
| Direct Impact | 152 | 16 |
| Reverse Impact | 160 | 0 |
| Adhesion X cut | 5A | 5A |
| Mek Double Rubs | 193 | 124 |
| 20 degree/60 degree gloss | 85/101 | 71/99 |
| Conical Mandril Flexibility | 32% | 32% |

From the above results, where an experimental curing agent dispersion has been pigmented and mixed with an experimental epoxy resin dispersion, and subsequently compared to a commercially available waterborne formulation of which the paint preparation was exactly similar, the following conclusions can be drawn: the new experimental system is at least comparable in performance and even outperforms the commercial system on flexibility, chemical resistance and gloss value. In addition to this excellent performance the advantage for the experimental system is it's very low VOC: a value of about 100 g/L or 1.0 lbs/gal in comparison to 240 g/L or 2 lbs/gal for the commercial systems.

The aliphatic based capping agents are usually hydrophobic in character, which tends to improve the coalescence properties of the epoxy-curing agent mixture at low temperatures, and tends to lower the glass transition temperature of the film or coating. The lower glass transition temperature improves the impact strength of the cured film. Aromatic based monoglycidyl capping agents, however, have the advantage of rendering the cured film more rigid, chemically resistant, and resistant to stresses at high temperatures. Any one of these types of capping agents may be used, and mixtures thereof are also advantageous to attain an overall balance of mechanical strength and chemical resistance.

We claim:

1. A curing agent for epoxy resins comprising a reaction product prepared by the steps comprising (a) reacting at least one polyamine having the formula:

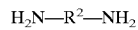

$$H_2N-R^2-NH_2$$

wherein $R^2$ is an aliphatic, cycloaliphatic, or aromatic group having from 2 to 18 carbon atoms, optionally containing non-reactive oxygen or at most an average of 4 secondary and/or tertiary nitrogen atoms per structure in the backbone, and at least one epoxy resin having a functionality of at least 1.5 in an epoxy functionality equivalents to polyamine mole ratio of 0.9:1 to 1:10, thereby producing an amine-terminated intermediate;

(b) reacting the amine-terminated intermediate with 0.5 to 25 weight percent, based on the amine-terminated intermediate, of an acid-terminated polyalkyleneglycol-containing compound having the formula:

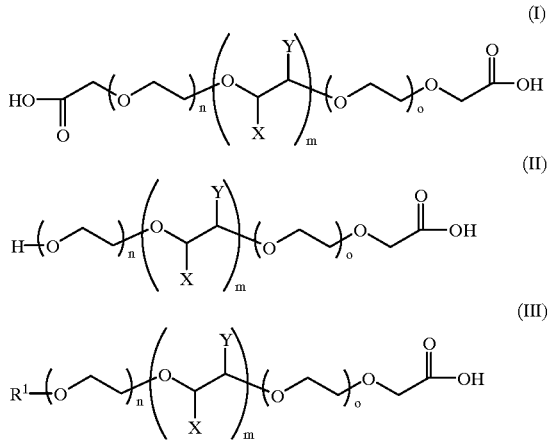

wherein R¹ is an alkyl, aryl, or arylalkyl group having from 1 to 15 carbon atoms; X and Y are independently a hydrogen, methyl or ethyl group with the provision that if X is methyl or ethyl, Y is hydrogen, or if Y is methyl or ethyl, X is hydrogen; n+m+o is a real number of from about 100 to about 200 and n+o is at least 70 percent of n+m+o; in a ratio of (I) to (II) by weight in the range of 100:0 to 0:100, a ratio of (I) to (III) by weight in the range of 100:0 to 0:100, and a ratio of (II) to (III) by weight in the range of 100:0 to 0:100, until essentially all of the acid group is consumed, thereby producing the amine-terminated curing agent.

2. The curing agent of claim 1 further comprising the steps of:
(c) reacting the amine-terminated curing agent with a monoepoxy in a amine hydrogen to epoxy groups ratio of from about 2:1 to about 30:1.

3. The curing agent of claim 2 wherein the amine-terminated curing agent is prepared by reacting the acid-terminated polyalkyleneglycol-containing compound of structures (I) and (II) wherein the ratio of (I) to (II) by weight is in the range of 99:1 to 1:99, and the amine-terminated intermediate.

4. The curing agent of claim 3 wherein the ratio of (I) to (II) by weight is in the range of 20:80 to 80:20.

5. The curing agent of claim 2 wherein the amine-terminated curing agent is prepared by reacting the acid-terminated polyalkyleneglycol-containing compound of structures (I) and (III) wherein the ratio of (I) to (III) by weight is in the range of 99:1 to 1:99, and the amine-terminated intermediate.

6. The curing agent of claim 5 wherein the ratio of (I) to (III) by weight is in the range of 20:80 to 80:20.

7. The curing agent of claim 2 wherein the amine-terminated curing agent is prepared by reacting the acid-terminated polyalkyleneglycol-containing compound of structures (II) and (III) wherein the ratio of (II) to (III) by weight is in the range of 99:1 to 1:99, and the amine-terminated intermediate.

8. The curing agent of claim 7 wherein the ratio of (II) to (III) by weight is in the range of 20:80 to 80:20.

9. The curing agent of claim 2 wherein the amine-terminated curing agent is prepared by reacting the acid-terminated polyalkyleneglycol-containing compound of structures (I), (II) and (III) in an amount of 4 to 98 percent by weight of (I), 1 to 95 percent by weight of (II), 1 to 95 and percent by weight of (III), and the amine-terminated intermediate.

10. The curing agent of claim 2 wherein the amine-terminated curing agent is prepared by reacting the acid-terminated polyalkyleneglycol-containing compound of structure (I), and the amine-terminated intermediate.

11. The curing agent of claim 10 wherein m is 0.

12. The curing agent of claim 2 wherein the amine-terminated curing agent is prepared by reacting the acid-terminated polyalkyleneglycol-containing compound of structure (II) and the amine-terminated intermediate.

13. The curing agent of claim 12 wherein m is 0.

14. The curing agent of claim 2 wherein the amine-terminated curing agent is prepared by reacting the acid-terminated polyalkyleneglycol-containing compound of structure (III) and the amine-terminated intermediate.

15. The curing agent of claim 14 wherein m is 0.

16. The curing agent of claim 2 wherein the polyamine is selected from the group consisting of m-xylylenediamine, 1,3-bisaminomethylcyclohexane, 2-methyl-1,5-pentanediamine, 1-ethyl-1,3-propanediamine, ethylenediamine, diethylenetriamine, triethylenetetramine, polyoxypropylenediamines, 2,2(4),4-trimethyl-1,6-hexanediamine, isophorone diamine, 2,4(6)-toluenediamine, 1,6-hexanediamine, 1,2-diaminocyclohexane, and para-aminodicyclohexyl methane.

17. The curing agent of claim 1 wherein the epoxy resin has from 1.5 to 8 epoxy groups.

18. The curing agent of claim 2 wherein the acid-terminated polyalkyleneglycol-containing compound is present in (b) in an amount of 1 to 10 weight percent, based on the amine-terminated intermediate.

19. The curing agent of claim 1 wherein the curing agent is prepared by reacting an acid-terminated polyalkyleneglycol alkylether having the formula

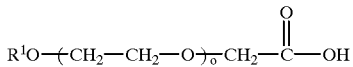

wherein R¹ is an alkyl, aryl, or arylalkyl group having from 1 to 15 carbon atoms, o is a positive real number of from about 100 to 200, and at least one diamine in an amine to acid equivalent ratio of from 6:1 to about 25:1.

20. The curing agent of claim 2 wherein the an acid-terminated polyalkyleneglycol alkylether is prepared by reacting an acid-terminated polyalkyleneglycol-containing compound having the formula

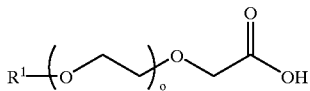

wherein R¹ is an alkyl or arylalkyl group having 1 to 15 carbon atoms, o is a positive real number of from about 100 to 200, and at least one amine-terminated intermediate in an amine to acid equivalent ratio of from 6:1 to about 25:1.

21. The curing agent of claim 7 wherein the epoxy resin is an epoxy resin having an epoxy functionality in the range of 1.7 to 2.5 produced from compounds containing at least 1.5 aromatic hydroxyl groups.

22. The curing agent of claim 2 wherein the monoepoxy is selected from the group consisting of glycidated $C_{8-20}$ aliphatic alcohol, $C_{1-18}$ alkylphenol glycidylether, glycidated versatic acid, and glycidoxyalkylalkoxysilanes.

23. A composition comprising (a) water; and (b) the curing agent of claim 1.

24. A composition comprising (a) water, and (b) the curing agent of claim 2.

25. A curing agent for epoxy resins comprising a reaction product prepared by the steps comprising (a) reacting at least one polyamine having the formula:

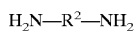

wherein $R^2$ is an aliphatic, cycloaliphatic, or aromatic group having 2 to 18 carbon atoms, optionally containing non-reactive oxygen or at most an average of 4 secondary and/or tertiary nitrogen atoms per structure in the backbone, and at least one epoxy resin having a functionality of at least 1.5 in an epoxy functionality equivalents to polyamine mole ratio of 0.9:1 to 1:10, thereby producing an amine-terminated intermediate;

(b) reacting the amine-terminated intermediate with a monoepoxy in an amine hydrogen atoms to epoxy groups ratio of bout 1.5:1 to about 30:1 to provide a capped amine-terminated intermediate;

(c) reacting the capped amine-terminated intermediate with 0.5 to 25 weight percent, based on the end-capped amine-terminated intermediate, of an acid-terminated polyalkyleneglycol-containing compound having the formula:

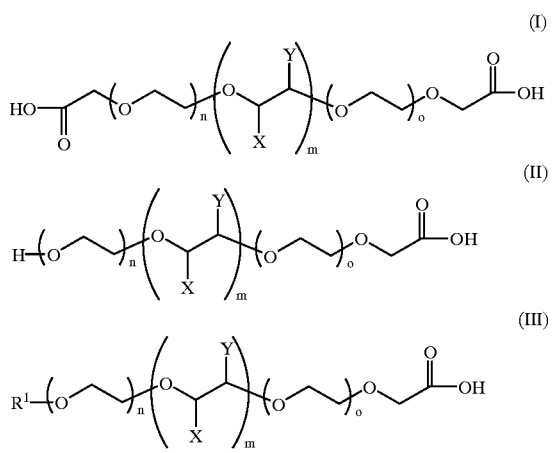

wherein $R^1$ is an alkyl, aryl, or arylalkyl group having from 1 to 15 carbon atoms; X and Y are independently a hydrogen, methyl or ethyl group with the provision that if X is methyl or ethyl, Y is hydrogen or if Y is methyl or ethyl, X is hydrogen; n+m+o is a real number of from about 100 to about 200 and n+o is at least 70 percent of n+m+o; in an a ratio of (I) to (II) by weight in the range of 100:0 to 0:100, a ratio of (I) to (III) by weight in the range of 100:0 to 0:100, and a ratio of (II) to (III) by weight in the range of 100:0 to 0:100, until essentially all of the acid group is consumed, thereby producing the amine-adduct curing agent.

26. The curing agent of claim 25 wherein the amine-adduct curing agent is prepared by reacting the acid-terminated polyalkyleneglycol-containing compound of structures (I) and (II) wherein the ratio of (I) to (II) by weight is in the range of 99:1 to 1:99, and the capped amine-terminated intermediate.

27. The curing agent of claim 26 wherein the ratio of (I) to (II) by weight is in the range of 20:80 to 80:20.

28. The curing agent of claim 25 wherein the amine-terminated curing agent is prepared by reacting the acid-terminated polyalkyleneglycol-containing compound of structures (I) and (III) wherein the ratio of (I) to (III) by weight is in the range of 99:1 to 1:99, and the capped amine-terminated intermediate.

29. The curing agent of claim 28 wherein the ratio of (I) to (III) by weight is in the range of 20:80 to 80:20.

30. The curing agent of claim 25 wherein the amine-terminated curing agent is prepared by reacting the acid-terminated polyalkyleneglycol-containing compound of structures (II) and (III) wherein the ratio of (II) to (III) by weight is in the range of 99:1 to 1:99, and the capped amine-terminated intermediate.

31. The curing agent of claim 30 wherein the ratio of (II) to (III) by weight is in the range of 20:80 to 80:20.

32. The curing agent of claim 25 wherein the amine-terminated curing agent is prepared by reacting the acid-terminated polyalkyleneglycol-containing compound of structures (I), (II) and (III) in an amount of 4 to 98 percent by weight of (I), 1 to 95 percent by weight of (II), 1 to 95 and percent by weight of (III), and the capped amine-terminated intermediate.

33. The curing agent of claim 25 wherein the amine-terminated curing agent is prepared by reacting the acid-terminated polyalkyleneglycol-containing compound of structure (I) and the capped amine-terminated intermediate.

34. The curing agent of claim 33 wherein m is 0.

35. The curing agent of claim 25 wherein the amine-terminated curing agent is prepared by reacting the acid-terminated polyalkyleneglycol-containing compound of structure (II) and the capped amine-terminated intermediate.

36. The curing agent of claim 35 wherein m is 0.

37. The curing agent of claim 25 wherein the amine-terminated curing agent is prepared by reacting the acid-terminated polyalkyleneglycol-containing compound of structure (III) and the capped amine-terminated intermediate.

38. The curing agent of claim 26 wherein m is 0.

39. The curing agent of claim 25 wherein the diamine is selected from the group consisting of m-xylylenediamine, 1,3-bisaminomethylcyclohexane, 2-methyl-1,5-pentanediamine, 1-ethyl-1,3-propanediamine, ethylenediamine, diethylenetriamine, triethylenetetramine, polyoxypropylenediamines, 2,2(4),4-trimethyl-1,6-hexanediamine, isophorone diamine, 2,4(6)-toluenediamine, 1,6-hexanediamine, 1,2-diaminocyclohexane, and para-aminocyclohexyl methane.

40. The curing agent of claim 25 wherein the epoxy resin has a functionality 1.5 to 8 epoxy groups.

41. The curing agent of claim 25 wherein the acid-terminated polyalkyleneglycol-containing compound is present in (b) in an amount of 1 to 10 weight percent, based on the amine-terminated intermediate.

42. The curing agent of claim 25 wherein the curing agent is prepared by reacting an acid-terminated polyalkyleneglycol alkylether having the formula

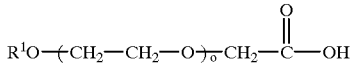

wherein $R^1$ is an alkyl, aryl, or arylalkyl group having from 1 to 15 carbon atoms, o is a positive real number from about 100 to 200, and at least one capped amine-terminated compound in an amine to acid equivalent ratio of from 6:1 to about 25:1.

43. The curing agent of claim 41 wherein the epoxy resin is an epoxy resin having an epoxy functionality in the range of 1.7 to 2.5 produced from compounds containing at least 1.5 aromatic hydroxyl groups.

44. The curing agent of claim 25 wherein the monoepoxy is selected from the group consisting of glycidated $C_{8-20}$ aliphatic alcohol, $C_{1-18}$ alkylphenol glycidylether, glycidated versatic acid, and glycidoxyalkylalkoxysilanes.

45. An composition comprising (a) water; and (b) curing agent of claim 25.

* * * * *